(12) United States Patent
Uz

(10) Patent No.: US 6,351,538 B1
(45) Date of Patent: Feb. 26, 2002

(54) CONDITIONAL ACCESS AND COPY PROTECTION SCHEME FOR MPEG ENCODED VIDEO DATA

(75) Inventor: K. Metin Uz, Los Altos, CA (US)

(73) Assignee: LSI Logic Corporation, Milpitas, CA (US)

( * ) Notice: Subject to any disclaimer, the term of this patent is extended or adjusted under 35 U.S.C. 154(b) by 0 days.

(21) Appl. No.: 09/168,390

(22) Filed: Oct. 6, 1998

(51) Int. Cl.[7] .................................................. H04L 9/00
(52) U.S. Cl. ...................................................... 380/201
(58) Field of Search .................................. 380/201, 200, 380/210, 239; 725/31

(56) References Cited

U.S. PATENT DOCUMENTS 5,268,961 A * 12/1993 Ng ............................ 348/425.2
5,852,664 A * 12/1998 Iverson et al. ................. 705/51
5,991,400 A * 11/1999 Kamperman ................ 380/239

* cited by examiner

Primary Examiner—Albert Decady
Assistant Examiner—Matthew Smithers
(74) Attorney, Agent, or Firm—Christopher P. Maiorana P.C.

(57) ABSTRACT

A method and apparatus are provided for restricting access to a digital video signal. According to the method, the digital video signal is encoded to produce an encoded video signal. In encoding the digital video signal, motion compensated encoding is performed on one or more first video picture portions of the digital video signal using a second video picture portion of the video signal as a reference for forming predictions. Only the second video picture portion of the encoded video signal is scrambled thereby producing a restricted access signal that is subsequently stored on a storage medium. Also provided is a method and apparatus for enabling access to a video signal. According to the method, the encoded video signal is received and only a first video picture portion of the video signal is descrambled. The encoded video signal is then decoded. In decoding the encoded video signal, motion compensated decoding is performed on one or more second video picture portions of the video signal using predictions formed from the descrambled first video picture portion thereby providing a decoded accessed signal.

39 Claims, 1 Drawing Sheet

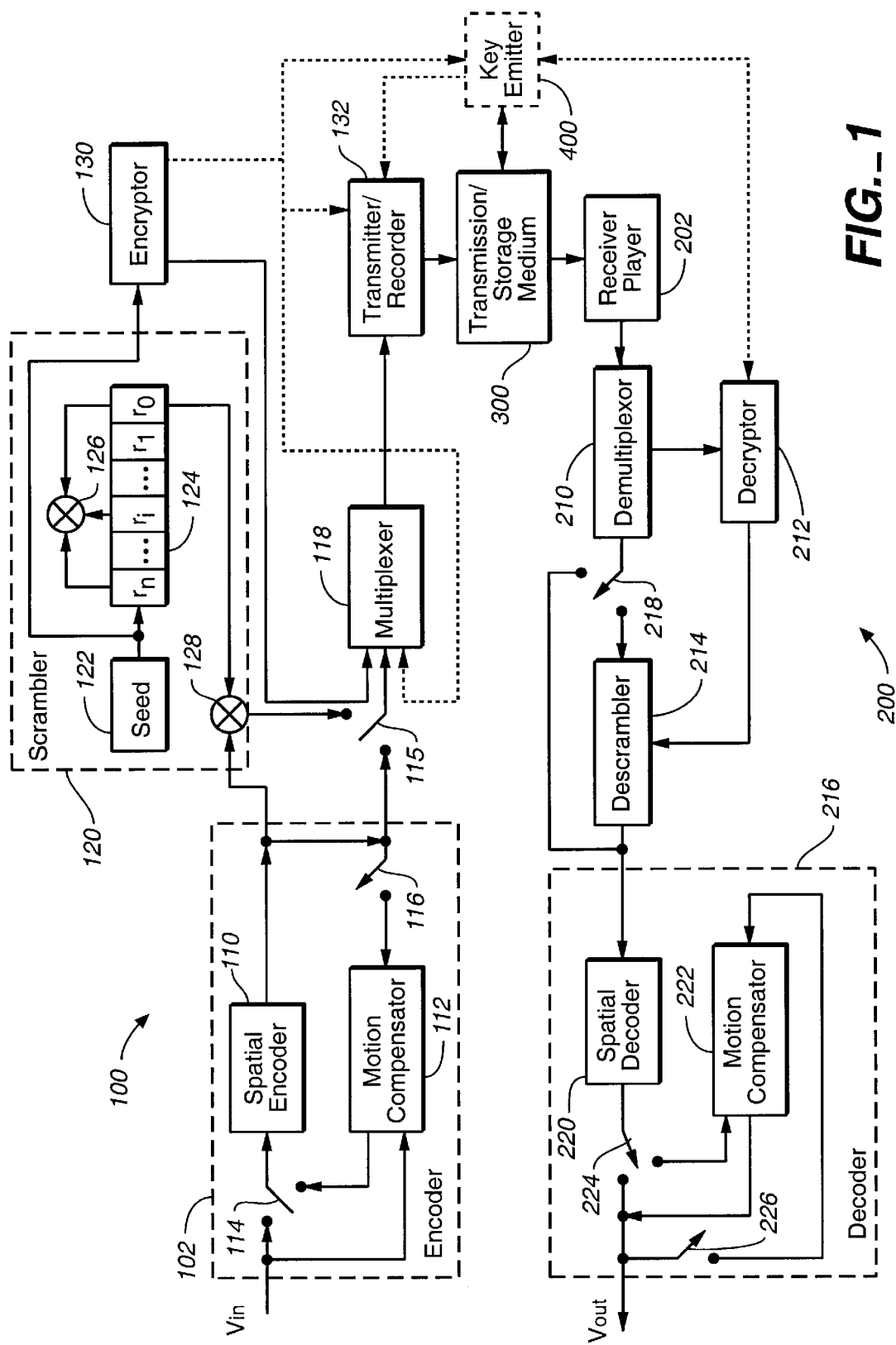
FIG._1

CONDITIONAL ACCESS AND COPY PROTECTION SCHEME FOR MPEG ENCODED VIDEO DATA

FIELD OF THE INVENTION

The present invention pertains to preventing unauthorized access and/or copying of compressed video data.

BACKGROUND OF THE INVENTION

Herein, the term encoded video signal is used to refer to a video signal that is compressed and formatted according to a predefined syntax and semantics of a well-known standard, such as MPEG-2. The term decoded video signal is used to refer to a video signal that has been deformatted, and decompressed, according to such a well-known standard, e.g., for presentation or display. The term scrambling is used to refer to a technique of rendering a video signal unintelligible using a not well known or secret formula or methodology. The term descrambling is used to refer to the inverse technique to scrambling that allows recovery of the video signal using the secret methodology. The term encryption refers to a particular manner of scrambling, for example, whereby a signal is rendered unintelligible using a key. The term decryption refers to an inverse technique to encrypting that allows recovery of the video signal, for example, using a key. Both private and public key encryption techniques are known. Herein, the terms "encryption" and "decryption" are used to refer to a higher complexity processing than "scrambling" and "descrambling" which (encryption, scrambling, decryption and descrambling) processings render information unintelligible or recover information from its unintelligible form.

A pervasive problem for distributors and broadcasters of video programs is the unauthorized access, e.g., viewing or copying, of the video programs. Both a broadcast service provider (such as a cable television or direct broadcast satellite service provider) and a content provider (such as a distributor of packaged media, e.g., video tapes and optical discs) desires to restrict access to video program under a variety of circumstances such as:

(1) restricting access by younger viewers to adult-oriented subject matter video programs, (2) restricting access to video program events (e.g., pay-per-view or rental video shows) or entire video program services (e.g., premium video program services) to only subscribers who pay for them, and (3) restricting access to video program events and video program services to subscribers in certain geographic regions.

The prior art has suggested several techniques for restricting unauthorized access to video programs including scrambling or encrypting the video program material. Authorized access is achieved by descrambling the video program material or by decrypting it with a key (wherein a public key encryption technique may be used). Good encryption techniques tend to thwart unauthorized access but generally impose a heavy penalty on the authorization system. Specifically, the decrypting process tends to be highly computationally intensive and therefore requires specialized high processing capability hardware.

It is an object of the present invention to reduce the computation requirements for restricting access to encoded video programs yet still provide a high level of protection against unauthorized access.

SUMMARY OF THE INVENTION

This and other objects are achieved by the present invention. According to one embodiment, a method and apparatus are provided for restricting access to a digital video signal. According to the method, the digital video signal is encoded to produce an encoded video signal. In encoding the digital video signal, motion compensated encoding is performed on one or more first video picture portions of the digital video signal using a second video picture portion of the video signal as a reference for forming predictions therefor. Only the second video picture portion of the encoded video signal is scrambled.

Illustratively, the second video picture portion is scrambled using a first function of a first information. The first information is then encrypted using a second function of higher computation complexity than the first function. The encrypted first information is then inserted into the encoded video signal.

Illustratively, the second video picture portion originates in an intracoded (I) or predictively encoded (P) picture which serves as a reference picture.

As may be appreciated, scrambling is preferably achieved using a simple (first) function such as XOR' ing the video picture data using a pseudo random sequence generated from a seed (first information). The seed can be encrypted using a complicated (second) encryption function which is difficult to discover without afore-knowledge of the particular second function used. Because only a limited amount of information is encrypted or scrambled, the processing needed for encoding or decoding the video signal is less than in the prior art.

Moreover, an additional savings is achieved by scrambling information in reference pictures. In particular, reference pictures are used to form predictions for motion compensated decoding of other pictures. By scrambling the information in the reference pictures used for forming predictions, it is not possible to obtain predictions for motion compensated decoding other pictures to produce intelligible video. Simply stated, the encoding process causes information in certain pictures (namely, reference pictures) to be more significant than others, and according to this invention, it is only this significant information which is scrambled.

According to another embodiment, a method and apparatus for enabling access to a video signal are provided. According to the method, The encoded video signal is received. Only a first video picture portion of the video signal is descrambled. The encoded video signal is then decoded. In decoding the encoded video signal, motion compensated decoding is performed on one or more second video picture portions of the video signal using predictions formed from the descrambled first video picture portion.

Illustratively, an encrypted version of the first information is retrieved from the encoded video signal. The first information is decrypted using a first function. The descrambling of the first video picture portion is descrambled using a second function of the decrypted information having a lower computation complexity than the first function.

BRIEF DESCRIPTION OF THE DRAWING

FIG. 1 depicts an encoding and decoding system according to an embodiment of the present invention.

DETAILED DESCRIPTION OF THE INVENTION

This invention is illustrated herein for conditional access to encoded video signals. The video signals are presumed to be encoded using the MPEG-1 or MPEG-2 standard. The video signal is assumed to be divided into pictures (fields or frames) wherein some pictures are intracoded (encoded without reference to another picture) and other pictures are interceded (encoded with reference to another picture). However, those skilled in the art will appreciate the applicability of this invention to any encoded signal that is divisible into portions, including some portions that are encoded without reference to other portions and other portions that are encoded with reference to other portions.

In addition, the invention is illustrated using a schema where "scrambling" is the low computation complexity processing applied to render information unintelligible and "encryption" is the higher computation complexity processing applied to render information unintelligible. However, other kinds of low and high computation complexity processing can be used, such as low and high complexity scrambling, low and high complexity encryption, etc.

Also, for sake of brevity, the description of encoding, scrambling, decoding and descrambling of other component signals (in MPEG-2 parlance, "elementary streams") of a video program, such as audio, closed captioned text, etc. has been omitted. Rather, the encoding, scrambling, decoding and descrambling of the video component signal is used as an illustration.

MPEG-2 encoding is now briefly reviewed. MPEG-2 encoding includes spatial encoding and temporal encoding. In spatial encoding, individual blocks or 8×8 arrays of the luminance and chrominance pixel data are discrete cosine transformed, quantized, (zig-zag or alternate) scanned into a sequence of quantized coefficients, run-level encoded and variable length encoded. Other format and header data is inserted at appropriate locations of the encoded data to help identify individual pictures, blocks, etc., as well as other specifiable parameters.

Temporal encoding includes motion compensation. Motion compensation is the process of finding an appropriate prediction for a to-be-motion compensated encoded portion of a video picture, in this case, a macroblock which is a 2×2 array of luminance blocks of pixel data and the chrominance blocks of pixel data overlaid on the 2×2 array of luminance blocks. The "prediction" is itself a macroblock extracted from one or more other pictures, called reference pictures, that precede and/or follow the picture containing the to-be-motion compensated macroblock. Prediction macroblocks may be spatially offset from (i.e., have different pixel row and column coordinates than) the to-be-motion compensated macroblock they predict. A motion vector is used to identify the prediction macroblock by its spatial offset from the macroblock it predicts. Preferably, the prediction macroblock is obtained by searching one or more reference pictures for a macroblock sized array of pixels therein that best matches a given to-be-encoded macroblock of the to-be-motion compensated encoded picture.

Once identified, the prediction macroblock is subtracted from the to-be-encoded macroblock to produce a prediction error macroblock. The individual luminance and chrominance blocks of the prediction error macroblock are then spatially encoded.

Encoded pictures are designated as one of a set of predefined types, wherein the manner of motion compensation that can be performed on each picture depends on the type of the picture. Intracoded or I pictures contain only macroblocks that are not motion compensated. That is, all macroblocks in an I picture are spatially only encoded. A predicted or P picture is a picture containing motion compensated macroblocks using a prediction that originates only in a picture that is presented (displayed) before the P picture.

Certain macroblocks of a P picture can also be intracoded if adequate prediction macroblocks cannot be found therefor or for other reasons described below. A bidirectionally predicted or B picture is a picture containing interceded macroblocks wherein prediction macroblocks may be obtained from a picture that is presented before the B picture, a picture that is presented after the B picture or both. Certain macroblocks of a B picture can also be intracoded macroblocks if adequate prediction macroblocks cannot be found therefor or for reasons described below. I and P pictures can be used as reference pictures. However, B pictures cannot be used as reference pictures. Preferably, as pictures are encoded, reference pictures are identified, decoded and stored locally in the encoder. The encoder can then use the reference pictures, as decoded and reconstructed, for generating prediction macroblocks. This ensures that the encoder forms the same prediction macroblocks as can be formed at the decoder.

Other more complex forms of prediction are permissible such as "dual-prime," "16×8," "field prediction of frame pictures," etc. A survey of such forms of predictions is described in B. Haskell, A. Puri & A. Netravali, Digital Video: An Introduction to MPEG-2, p. 149–154 (1997). Often, more than one prediction macroblock can be chosen. The chosen prediction is indicated by header information in the formatted bitstream.

In decoding the encoded video signal, the header and control information is removed from the encoded video signal and used to determine how to decoded the encoded picture data. Each block of each macroblock is spatially decoded and reformulated into a macroblock. If the macroblock was motion compensated, the motion vector(s) for the macroblock is (are) obtained from the encoded video signal and used to retrieve the appropriate prediction macroblock(s) from the respective decoded, reconstructed reference picture locally stored at the decoder. (If multiple prediction macroblocks are retrieved for predicting a single spatially decoded prediction error macroblock, they are interpolated.) The prediction macroblock is added to the spatially decoded macroblock to produce a reconstructed macroblock. The reconstructed macroblocks are then arranged to reconstruct the decoded picture. Reconstructed reference pictures are also locally stored for use in predicting future motion compensated encoded video pictures. Much freedom is afforded under MPEG-2 in designating pictures as I, P or B. One manner of doing so is to aggregate the pictures into contiguous sequential groups. The first picture of each group of pictures is designated an I picture. The successive pictures are designated as a particular type based on a predefined pattern, e.g., IBBPBBPBBPBB. Note that each B and P picture relies on the data of a preceding picture for use in motion compensated decoding of the picture. By starting each group of pictures on an I picture, it is possible to randomly begin decoding at any desired group without loss of picture quality.

In addition, or in the alternative, selected macroblocks are forced to be intracoded regardless of whether they are in P or B pictures and regardless of whether or not there is an adequate prediction macroblock therefor. Using a technique called intra slice refresh, selected slices are forced to be intracoded in respective pictures, where each slice is a contiguous horizontal row of macroblocks from the left edge of the screen to the right edge of the screen. For example, one or more slices in non-contiguous macroblock rows may be selected in a first picture for intracoding. In the next picture, an equal number of slices offset by one macroblock row from the respective slices in the previous picture may be designated for intracoding, and so on. Over a sequence of pictures, each slice is intracoded once. This enables starting decoding at any random picture in the sequence regardless of whether or not it is an I picture although, several pictures may need to be decoded before an intelligible picture is produced.

FIG. 1 shows a conditional access encoding system 100 according to an embodiment of the present invention. The conditional access encoding system 100 illustratively comprises a video encoder 102, a multiplexer 118, a scrambler 120, an encryptor 130 and a transmitter/recorder 132. Illustratively, the conditional access encoding system 100 may be implemented using one or more suitably programmed processors, such as the DV Expert™ video encoder processor distributed by C-Cube Microsystems, Inc.™, a company located in Milpitas, Calif.

An uncompressed digital video signal is inputted at an input terminal Vin of the encoder 102. As shown, the encoder 102 includes a spatial encoder 110 and a motion compensator (type of temporal encoder) 112. The uncompressed digital video signal is either only spatially encoded in spatial encoder 110 or motion compensated in motion compensator 112 and spatially encoded in spatial encoder 110. The decision of whether to spatially only encode (intracode) or motion compensate and spatially encode (intercede) is represented by a switch 114 (which may in fact be a decision or branch controller in a processor) which the encoder 102 controls in response to the selected picture type and the ability to find an adequate matching prediction macroblock. The spatially encoded macroblocks of reference pictures are fed back from the spatial encoder 110 to the motion compensator 112. Such encoded macroblocks of reference pictures are decoded and used to reconstruct decompressed reference pictures. The decompressed reference pictures are stored in a picture memory (not shown) for use in forming predictions of other pictures. The selective feedback of encoded macroblocks is represented by switch 116.

The encoded video signal (including at least encoded macroblock data) is outputted from the video encoder 102 to a multiplexer 118 and a scrambler 120. The multiplexer 118 selects only certain portions of the encoded video signal outputted from the encoder 102. This selection is represented by the switch 115. In place of other portions of the encoded video signal, the multiplexer 118 selects the scrambled version of such encoded portions of the video signal produced by the scrambler 120. The multiplexer 118 can also receive other header and control information for multiplexing into the encoded/scrambled video signal. Alternatively, such header and control information may be inserted into the encoded video signal outputted from the video encoder 102 to both the multiplexer 118 and the scrambler 120. As described below, an encryptor 130 and/or a key emitter 400 can also provide information for multiplexing into the encoded/scrambled video signal.

Illustratively, a judicious selection of which portions to scramble and which portions not to scramble is made so as to conserve processing requirements but to nevertheless dramatically impact the encoded video signal so as to render it unintelligible without descrambling. As noted above, certain portions of the video signal, namely, interceded macroblocks, are coded by subtracting a prediction therefrom, which prediction originates in another portion of the video signal. Accordingly, if one or more portions of the reference pictures (from which predictions are formed) are scrambled, then not only will the reference pictures be unintelligible but any other picture portion predicted from such scrambled portions of the reference picture will also be unintelligible. Effectively, less than all of the video signal need be scrambled to nevertheless render the entire video signal unintelligible.

As noted above, a criteria used in determining which portions to scramble is whether or not the portion of the video signal forms part of a reference picture. In one embodiment, not all of each reference picture need be scrambled. Note that it is generally sufficient to scramble less than all of a reference picture to render it unintelligible. For example, macroblocks can be selected at random or according to a pseudo-random repeating pattern. Alternatively, an entire selected reference picture, including all of its header information is scrambled. In yet another embodiment, the scrambling of a picture occurs at a particular bit offset from a fixed reference of the encoded video signal. For example, scrambling can be controlled to begin on a particular bit of a to-be-scrambled picture, which bit is offset from the picture start code, user data start code, etc. Scrambling can be caused to occur for a certain number of bits of the encoded video signal or to end at a particular bit offset. It may also be desirable to scramble only selected pictures, such as each I picture of each group of pictures, as such scrambled I pictures would tend to propagate visual errors and discontinuities into all subsequent pictures of the group of pictures. The decision of which pictures, and portions thereof, to scramble may be fixed or variably set in the encoding system 100. These decisions may be effected, e.g., based on information or decisions made in the video encoder 102 or by the multiplexer 118, which operates a switch 115.

An illustrative scrambler 120 uses a simple, easily invertible scrambling function. The scrambler 120 simply XOR's the bits of the to be scrambled encoded video signal portion with a pseudo random sequence. Such a technique is well known. For example, an initially selected pseudo random number or "seed" is generated by the seed circuit 122. The seed circuit 122 can be any conventional random number generator. The seed is a binary number $r_0 r_1, \ldots r_n$ having n+1 bits, where n is an integer greater than 1. The seed is loaded into a shift register 124 which shifts the bits therein to the left in synchronism with the output of the bits of the to-be-scrambled video data. Illustratively, a new seed can be generated at regular intervals (e.g., every j macroblocks, every m scrambled bits, every k scrambled pictures, etc., where j, k and/or m are non-negative integers) or at random intervals. An XOR circuit 126 XOR's the $i^{th}$ and $n^{th}$ bits in the shift register 124 and shifts the results of this XOR operation into the $0^{th}$ bit position of the shift register 124. The $0^{th}$ bit $r_0$ is furthermore outputted to an XOR circuit 128. The XOR circuit 128 also receives the very next, to-be-scrambled bit of the encoded video signal. The XOR circuit 128 XOR's the two inputted bits and outputs the XOR'ed bit as the scrambled bit.

As may be appreciated, the scrambling of bits uses a low computation complexity function which is furthermore easy to invert. Specifically, the same seed as was used for scrambling can be used in an identical circuit including elements 124, 126 and 128 for descrambling the scrambled, encoded video signal. In order to prevent unauthorized descrambling, new seeds are periodically and frequently generated. Each generated seed is fed to an encryptor 130 which encrypts the seed using a high computation complexity function. Any well known function which is difficult to discover through mere examination of information encrypted therewith may be used, such as a function needed to solve a so-called "NP complete" problem. Examples of such problems include the so-called "rational knapsack" problem and factoring the products of two large prime numbers. Generally, such functions utilize an encryption key in encrypting information. Such encryption keys may be generated by a key generator of the encryptor 130 and corresponding decryption keys may be made available for output. Note that encryption using keys is just one of many computationally complex schemas which can be used to render the descrambling key unusable, except to those who are authorized.

The encrypted seeds can be treated as encrypted descrambling keys. The encrypted descrambling keys are then outputted to the multiplexer 118 which inserts scrambling information, such as the encrypted descrambling keys, into the encoded, scrambled video signal bitstream. Alternatively, some or all of the scrambling information may be placed in a separate file, e.g., stored on a storage medium. Other scrambling information indicating the scrambling start offset and end offset, or number of scrambled bits, also may be provided in any one of the above noted locations. Such other scrambling information may, itself, be completely encrypted and/or scrambled, completely unencrypted and/or unscrambled or partly encrypted and/or partly scrambled. Scrambling information such as encrypted descrambling keys can be stored in a user data section of the encoded video signal according to the MPEG-2 syntax. Alternatively, some or all of the scrambling information may be placed in a private data section, pack or transport packet. Advantageously, the scrambling information is inserted into a portion of the encoded, scrambled video signal in advance of the encoded video signal portion that they can descramble.

The scrambled encoded video signal is then outputted from the multiplexer 118 to a transmitter/recorder 132. If the encoded video signal is to be broadcasted, the element 132 is a transmitter (such as a modulator, ATM cell segmenter, etc.) which transmits the encoded video signal on a transmission medium 300 (such as the air, space, electrical conductors, wires or cables, optical fibers, etc.) In such a case, the transmitted signal may include: (1) nonscrambled, encoded video signal portions, (2) scrambled encoded video signal portions and (3) (encrypted) descrambling keys. In addition, decryption keys, for decrypting the encrypted descrambling keys may also be transmitted in the signal by the transmitter 132. The decryption keys are another type of scrambling information and therefore may be embedded in the encoded, scrambled video signal. Illustratively, the decryption keys may be transmitted in the signal using a key emitter 400. The key emitter 400 determines the appropriate time to transmit the decryption keys (not too soon and not too late). The key emitter 400 may further encrypt the decryption keys according to a public key encryption system. The key emitter 400 may be a device which is remote from both the encoder system 100 and decoder system 200. The key emitter 400 may be a polled device or a device that automatically transmits decryption keys. Transmitted decryption keys are illustratively communicated from the key emitter 400 to the transmitter/recorder 132 for transmission/storage, to the multiplexer 118 for multiplexing into the encoded signal or some other transmitter/recorder (e.g., a burst cutting area laser, a telephone network, etc.) not shown for separate transmission (by the same or a different transmission channel 300).

Note that scrambling information can be delivered in a variety of different fashions. In fact, different portions of the scrambling information can be delivered in different ways for a single encoded, scrambled video signal. For instance, in one embodiment, scrambling seeds are selected, e.g., in a predetermined or random fashion, at the time of encoding. Either at the time of encoding, or at the time of transmission, all of the seeds used for encoding the video signal are collected into a table, e.g., in encrypted form (where either public or private key encryption may be used). The table of (encrypted) seeds may be placed into a file or the encoded, scrambled video signal itself for preliminary one time (or continuous) transfer via the medium 300. The offset, indicating the start of scrambling, and the indication of the amount of scrambled data, are generated at the time of encoding. The offset, amount indication, and index of the seed in the (encrypted) seed table, may be inserted into a file or user data section associated with the picture that they scramble (in encrypted or unencrypted form). In yet another alternative, the seeds are randomly generated and are encrypted using a specific key of a decryption key table. The table of decryption keys are (encrypted and) transferred via a separate file or section of the encoded, scrambled video signal. The offset, amount indication, encrypted seed and index to the decryption key are transferred in a user data section of the picture for which they can be used to descramble. Thus, in this embodiment, the scrambling information is divided into two types for separate transfer. Scrambling information which is specific to a portion of the scrambled video signal (e.g., the offset, amount indication and seed table index, or the offset, amount indication, encrypted seed and decryption key table index) are transferred via the medium 300 in a section associated with the portion of the encoded, scrambled video signal they descramble (e.g., a user data section). On the other hand, scrambling information which is not specific to a scrambled portion of the encoded, scrambled video signal (e.g., the table of seeds or the table of decryption keys) are transferred via a separate file, portion, or stream of the encoded, scrambled video signal.

If the encoded video signal is to be recorded or stored, the element 132 is a recorder (e.g., a video tape recorder, a magnetic disk, a recordable optical disc, an optical disc mastering device, etc.) which stores the encoded video signal on a storage medium 300 (e.g., magnetic tape, magnetic disk, optical disc, etc.). The signal stored on the storage medium 300 includes (1) non-scrambled encoded video signal portions stored in first areas on the storage medium, (2) scrambled encoded video signal portions stored in second areas on the storage medium and (3) (encrypted) descrambling keys stored in third areas on the storage medium. The (encrypted) descrambling keys may be stored in one or more separate files as the encoded video signal or within the encoded video signal itself (e.g., in a user data section of a scrambled picture). Decryption key(s) for decrypting the descrambling keys furthermore may be stored in fourth areas on the storage medium. In the case of an optical disc, such decryption keys may be provided in the lead-in section or burst cutting area of the disc. However, the decryption keys may also be provided in separate files or within the encoded video signal itself (e.g., in the user data section).

FIG. 1 also shows a conditional access decoding system 200. An illustrative conditional access decoding system 200 includes at least a video decoder 216, a descrambler 214, a demultiplexer 210, a decryptor 212 and a receiver 202. The conditional access decoding system 200 is illustratively implemented using one or more suitably programmed processors such as an AViA™ or a ZiVA™ video decoder processor, or a DV Expert™ video encoder processor, all of which are distributed by C-Cube Microsystems, Inc.™. (In one embodiment, a single DV Expert™ video encoder processor is used to implement both the conditional access encoder system 100 and the conditional access decoder system 200.)

The video program bearing signal is received from the medium 300 at (received from a transmission medium at, or reproduced from a storage medium by) a receiver/player 202. The receiver/player 202 can be a demodulator, ATM cell reassembler, optical disc, magnetic disk or tape player, etc. The scrambled encoded video signal is then demultiplexed by a demultiplexer 210. Specifically, the demultiplexer 210 retrieves the encrypted descrambling keys and provides them to the decryptor 212. The decryptor 212 illustratively decrypts the descrambling keys using a decryption key. Such a decryption key preferably is provided using a public key encryption system. For example, the conditional access decoding system 200 may poll the key emitter 400 for a decryption key. The key emitter 400 can be located remotely from the conditional access decoding system 200. Alternatively, the key emitter 400 is contained in the conditional access decoding system 200. Such a key emitter 400 may store the decryption key(s) and provide each decryption key to the decryptor 212 as needed. In yet another alternative, the key emitter 400 reads the needed decryption key from the storage medium 300 (e.g., the lead-in area or burst cutting area of an optical disc, a file, etc.). Preferably, the key emitter 400 only provides the needed decryption key if the viewing of the video signal has been authorized. Such authorization may be in the form of a subscriber agreeing to pay for viewing the program, a parental authorization or a geographic distribution authorization.

The decryptor 212 uses the decryption keys to decrypt each descrambling key, i.e., each descrambling seed. Such descrambling seeds are provided to a descrambler 214. The descrambler 214 may have a very similar construction as the scrambler 120 including a shift register and two XOR circuits. In place of the seed generator, the descrambler 214 simply loads in the decrypted descrambling seeds outputted by the decryptor 212 at the appropriate time. Synchronization of when to use each descrambling seed may be achieved using a predefined schema or scrambling information contained in the encoded, scrambled video signal indicating when each descrambling seed is to be loaded and used (i.e., start of scrambling offset, end of scrambling offset or amount of scrambled video data, etc.).

Demultiplexed encoded video data is selectively provided to either the descrambler 214 or directly to the decoder 216. The determination as to whether to descramble or not descramble portions of the encoded video may be determined based on a predefined schema (e.g., each macroblock of an I picture, every odd slice, etc.) or in accordance with scrambling information placed in the encoded, scrambled video signal bitstream (e.g., in the user data sections) indicating which portions (e.g., offsets indicating the beginning of a scrambled section, and the amount of scrambled video data) of the encoded video signal are scrambled. The decision of whether or not to descramble a portion of the video signal is represented by the switch 218.

The encoded video signal outputted directly from the switch 218 or via the descrambler 214 is decoded by the decoder 216. The encoded video signal is first spatially decoded in spatial decoder 220. Then, spatially decoded prediction error macroblocks are motion compensated decoded in motion compensator 222. Spatially decoded intra macroblocks are simply used to reconstruct the pictures and are not motion compensated. The decision of whether or not to motion compensate a spatially decoded macroblock is represented by switch 224 and depends on header information in the encoded video signal. Reconstructed picture data of reference pictures is fed back to the motion compensator 222 and stored in a picture memory therein for use in motion compensated decoding of other decoded picture data. A switch 226 is provided representing the decision as to whether or not to store a decoded picture. The reconstructed pictures are then outputted from an output Vout for presentation.

The above discussion is intended to be merely illustrative of the invention. Those having ordinary skill in the art may devise numerous alternative embodiments without departing from the spirit and scope of the following claims.

What is claimed is:

1. A method of restricting access to a digital video signal comprising the steps of:
    (a) encoding said digital video signal, including motion compensated encoding one or more first video picture portions of said digital video signal using a second video picture portion of said digital video signal as a reference for forming predictions for said one or more first video picture portions of said digital video signal, to produce an encoded video signal;
    (b) scrambling only said second video picture portion of said encoded video signal; and
    (c) inserting scrambling information specific to descrambling a particular second video picture portion into a user data section of said encoded video signal associated with said second video picture portion, wherein said scrambling information includes an identification of a location of said second video picture portion within said encoded video signal.

2. The method of claim 1, wherein said second video picture portion originates in a reference picture.

3. The method of claim 1, wherein said second video picture portion originates in an intracoded picture.

4. The method of claim 1, wherein said second video picture portion originates in a predicted picture.

5. The method of claim 1, further comprising the steps of:
    scrambling said second video picture portion in step (b) using a first function of a first information;
    encrypting said first information using a second function of higher computation complexity than said first function; and
    inserting said encrypted first information into said encoded video signal.

6. The method of claim 5, wherein said encrypted first information is inserted into a user data section of said encoded video signal.

7. The method of claim 5, further comprising the steps of:
    decrypting said first information using an inverse of said second function,
    descrambling said second video picture portion of said encoded video signal using an inverse of said first function, said inverse of said first function having a lower computation complexity than said inverse of said second function, and
    decoding said encoded video signal, including motion compensated decoding said first video picture portion of said encoded video signal using predictions formed from said second video picture portion of said encoded video signal.

8. The method of claim 1, further comprising the step of broadcasting said encoded video signal.

9. The method of claim 1, further comprising the step of storing said encoded video signal on a storage medium.

10. A method for enabling access to a video program comprising the steps of:
 (a) receiving an encoded video signal;
 (b) descrambling only a first video picture portion of said encoded video signal;
 (c) encoding said encoded video signal including motion compensated decoding one or more second video picture portions of said encoded video signal using predictions formed from said descrambled video picture portion;
 (d) retrieving scrambling information from a user data section of said encoded video signal associated with said first video picture portion for use in step (b); and
 (e) identifying a location of said first video picture portion within said encoded video signal using an indication contained within said scrambling information.

11. The method of claim 10 wherein said second video picture portion originates in a reference picture.

12. The method of claim 10 wherein said second video picture portion originates in an intracoded picture.

13. The method of claim 10 wherein said second video picture portion originates in apredicted picture.

14. The method of claim 10 further comprising the steps of:
 retrieving a first information from said encoded video signal,
 encrypting said first information using a first function, and
 performing said step of descrambling using a second function of said decrypted first information having a lower computation complexity than said first function.

15. The method of claim 14 further comprising the step of retrieving said first information from a user data section of said encoded video signal associated with said first video picture portion.

16. An apparatus for restricting access to a digital video signal comprising:
 (a) an encoder for encoding said digital video signal, including motion compensated encoding one or more first video picture portions of said digital video signal using a second video picture portion of said video signal as a reference for forming predictions for said one or more first video picture portions of said digital video signal, to produce an encoded video signal; and
 (b) a scrambler for scrambling only said second video picture portion of said encoded video signal by inserting scrambling information into a user data section of said encoded video signal associated with said second video picture portion, wherein said scrambling information includes an identification of a location of said second video picture portion within said encoded video signal.

17. The apparatus of claim 16 wherein said second video picture portion originates in a reference picture.

18. The apparatus of claim 16 wherein said second picture portion originates in an intracoded picture.

19. The apparatus of claim 16 wherein said second video picture portion originates in a predicted picture.

20. The apparatus of claim 16 wherein said scrambler scrambles said second video picture portion using a first function of a first information, said apparatus further comprising:
 (c) an encryptor for encrypting said first information using a second function of higher computation complexity than said first function, and
 (d) a multiplexer for inserting said encrypted first information into said encoded video signal.

21. The apparatus of claim 20 wherein said encrypted first information is inserted into a user data section of said encoded video signal.

22. The apparatus of claim 20 further comprising:
 a decryptor for decrypting said first information using an inverse of said second function,
 a descrambler for descrambling said second video picture portion of said encoded video signal using an inverse of said first function, said inverse of said first function having a lower computation complexity than said inverse of said second function, and
 a decoder for decoding said encoded video signal, including motion compensated decoding said first video picture portion of said encoded video signal using predictions formed from said second video picture portion of said encoded video signal.

23. The apparatus of claim 16 further comprising a transmitter for broadcasting said encoded video signal.

24. The apparatus of claim 16 further comprising a storage medium for storing said encoded video signal on a storage medium.

25. An apparatus for enabling access to a video program comprising:
 (a) a descrambler for receiving an encoded video signal and for descrambling only a first video picture portion of said received encoded video signal, and
 (b) a decoder for decoding said encoded video signal including motion compensated decoding one or more second video picture portions of said encoded video signal using predictions formed from said descrambled video picture portion, wherein scrambling information is retrieved from a user data section of said encoded video signal associated with said first video picture portion for use is descrambling said first video picture portion, said retrieved scrambling information includes an indication that identifies a location of said first video picture portion within said encoded video signal.

26. The apparatus of claim 25 wherein said second video picture portion originates in a reference picture.

27. The apparatus of claim 25 wherein said second video picture portion originates in an intracoded picture.

28. The apparatus of claim 25 wherein said second video picture portion originates in a predicted picture.

29. The apparatus of claim 25 further comprising:
 (c) a decryptor for retrieving a first information from said encoded video signal, and for decrypting said first information using a first function, wherein said descrambler descrambles said second video picture portion of said encoded video signal using a second function of said decrypted information having a lower computation complexity than said first function.

30. The apparatus of claim 29 wherein said first information is retrieved from a user data section of said encoded video signal associated with said first video picture portion.

31. A bitstream comprising:
 (a) one or more first encoded video picture portions of a digital video signal which are motion compensated encoded using predictions formed from a second video picture portion of said digital video signal;
 (b) a scrambled version of only said second video picture portion of said digital video signal; and
 (c) a user data section associated with said second video picture portion containing scrambling information for descrambling said second video picture portion, wherein said scrambling information includes an indication of a location within said bitstream of said second video picture portion.

32. The bitstream of claim 31 further comprising:

an encrypted version of a first information capable of descrambling said scrambled version of said second video picture portion.

33. The bitstream of claim 32 wherein said encrypted version of said first information is contained within a user data section of said bitstream associated with said second video picture portion.

34. A storage medium comprising:

(a) a first storage area for storing one or more first encoded video picture portions of a digital video signal which are motion compensated encoded using predictions formed from a second video picture portion of said digital video signal;

(b) a second storage area for storing a scrambled version of only said second video picture portion of said digital video signal; and (c) a user data section associated with said second video picture portion containing scrambling information for descrambling said second video picture portion, wherein said scrambling information includes an indication of a location within said digital video signal of said second video picture portion.

35. The storage medium of claim 34 further comprising:

a third storage area for storing an encrypted version of a first information capable of descrambling said scrambled version of said second video picture portion.

36. An encoded digital video signal produced by the steps of:

(a) encoding said digital video signal, including motion compensated encoding one or more first video picture portions of said digital video signal using a second video picture portion of said digital video signal as a reference for forming predictions for said one or more first video picture portions of said digital video signal, to produce an encoded video signal;

(b) scrambling only said second video picture portion of said encoded video signal; and (c) inserting scrambling information specific to descrambling a particular second video picture portion into a user data section of said encoded video signal associated with said second video picture portion, wherein said scrambling information includes an identification of a location of said second video picture portion within said encoded video signal.

37. The encoded digital video signal of claim 36 produced by the further steps of:

scrambling said second video picture portion in step (b) using a first function of a first information, encrypting said first information using a second function of higher computation complexity than said first function, and inserting said encrypted first information into said encoded video signal.

38. A decoded video signal produced by the steps of:

(a) receiving an encoded video signal;

(b) descrambling only a first video picture portion of said video signal;

(c) decoding said encoded video signal including motion compensated decoding one or more second video picture portions of said video signal using predictions formed from said descrambled video picture portion;

(d) retrieving scrambling information from a user data section of said encoded video signal associated with said first video picture portion for use in step (b); and (e) identifying a location of said first video picture portion within said encoded video signal using an indication contained within said scrambling information.

39. The decoded video signal of claim 38 produced by the further steps of:

retrieving a first information from said encoded video signal, decrypting said first information using a first function, and performing said step of descrambling using a second function of said decrypted information having a lower computation complexity than said first function.

* * * * *